United States Patent

Maro et al.

Patent Number: 5,804,300
Date of Patent: Sep. 8, 1998

[54] METHOD OF PRODUCING LAMINATED PACKAGING MATERIAL

[75] Inventors: Hideharu Maro; Hideki Kodaira; Hiroshi Iwase; Yuji Komiya, all of Tokyo, Japan

[73] Assignee: Toppan Printing Co., Ltd., Tokyo, Japan

[21] Appl. No.: 469,374

[22] Filed: Jun. 6, 1995

Related U.S. Application Data

[63] Continuation of Ser. No. 107,801, filed as PCT/JP92/01723 Dec. 28, 1992 published as WO93/12923 Jul. 8, 1993, abandoned.

[30] Foreign Application Priority Data

Dec. 28, 1991 [JP] Japan ................................... 3-358829
May 19, 1992 [JP] Japan ................................... 4-151392

[51] Int. Cl.⁶ ............................... B29D 9/00; B32B 9/00; B65D 65/40; B65D 81/24
[52] U.S. Cl. ............... 428/335; 156/244.11; 156/244.12; 156/244.13; 428/35.2; 428/336; 428/349; 428/448; 428/451
[58] Field of Search ..................................... 428/335, 336, 428/446, 451, 452, 35.2, 35.9, 36.91, 346, 347, 349, 353, 354, 448; 156/244.11, 244.12, 244.13

[56] References Cited

U.S. PATENT DOCUMENTS 5,232,755  8/1993  Komiya et al. ...................... 428/36.91

FOREIGN PATENT DOCUMENTS 0 372 489  6/1990  European Pat. Off. .
3 300 411  7/1983  Germany .
52-24608  6/1977  Japan .
53-42310  10/1978  Japan .
62-35840  2/1987  Japan .
2-34330  2/1990  Japan .

OTHER PUBLICATIONS

AN 90–088394, Database WPI, Week 9012, Derwent Publications Ltd., London, England. Feb. 13, 1990.
AN 91–121873, Database WPI, Week 9117, Derwent Publications Ltd., london, England. Mar. 18, 1991.
"Wrapping Material Having Gas Barrier Property", M. Michihiro et al., Patent Abstracts of Japan, JP–3–061530 (Toppan Printing Co., Ltd.), Mar. 3, 1991.
English translation of International Search Report Oct. 25, 1993.

*Primary Examiner*—D. S. Nakarani
*Attorney, Agent, or Firm*—Staas & Halsey

[57] ABSTRACT

In the production of a laminated packaging material formed of a laminate comprising a base film, a silicon oxide layer and a sealing medium layer, the sealing medium layer is formed by laminating a thermoplastic resin to the silicon oxide layer by extrusion coating in a thickness of 30 μm or less. At this time, in addition to the thermoplastic resin layer formed by extrusion coating, an additional thermoplastic resin film may be laminated to its outside so that they are put together to form a layer serving as the sealing medium layer. In this case, lamination is carried out to extrude a thermoplastic resin between the silicon oxide layer and the thermoplastic resin film in a layer thickness of 30 μm or less. In a lengthwise pillow type laminated packaging material formed of a laminate comprising a sealing medium layer, a base film and a silicon oxide layer, a thermoplastic resin layer and an outer substrate are further laminated outside the silicon oxide layer at the same time the thermoplastic resin layer is formed, by extruding a thermoplastic resin between the outer substrate and the silicon oxide layer.

5 Claims, 4 Drawing Sheets

METHOD OF PRODUCING LAMINATED PACKAGING MATERIAL

This application is a continuation of application Ser. No. 08/107,801, filed as PCT/JP92/01723 Dec. 28, 1992 published as WO93/12923 Jul. 8, 1993, now abandoned.

BACKGROUND OF THE INVENTION

1. Field of the Invention

This invention relates to a method of producing a laminated packaging material having a silicon oxide layer as a gas barrier layer, in particular, as an oxygen and water-vapor barrier layer. More particularly, the present invention relates to a method of producing a laminated packaging material that may cause no lowering of gas barrier properties, in particular, can achieve superior oxygen barrier properties and water-vapor barrier properties, even when a heat-sealable thermoplastic resin is extrusion-coated on the silicon oxide layer.

The present invention also relates to a lengthwise pillow type laminated packaging material having a silicon oxide layer serving as a gas barrier layer, in particular, as an oxygen and water-vapor barrier layer.

2. Description of the Related Art

Packages for food or medical supplies have been hitherto commonly produced in the form of a pouch, which is a baglike container receptacle. As materials therefor, those comprising a substrate formed of a plastic film are in wide use.

Such packaging materials are required to have various functions and performances according to their contents. Among such functions and performances, they are often required to have gas barrier properties, in particular, oxygen barrier properties and water-vapor barrier properties so that the contents can be prevented from deterioration due to oxidation or from drying. As a method for imparting such oxygen barrier properties and water-vapor barrier properties to the plastic film, it is prevalent to laminate aluminum foil to plastic film. Packages making use of a laminated packaging material comprising aluminum foil can be exemplified by a lengthwise pillow type package, which is a kind of form for food packaging. In this instance, as materials for the lengthwise pillow type package, it is common to use a laminated packaging material formed of a laminate comprising a polyester film as a substrate, an aluminum foil as an oxygen and water-vapor barrier layer, and a heat-sealable thermoplastic resin film (a sealing medium layer). As the lengthwise pillow type packages, those comprising such a laminated packaging material the whole surfaces of which are provided with prints to improve their decorative effect have been hitherto in wide use.

FIG. 3 shows a method of producing a lengthwise pillow type package using such a laminated packaging material. As shown in the drawing, first, a laminated packaging material 31 is folded while it is drawn through the top 32a of a lengthwise pillow type packaging jig 32, so as to be wrapped around a container fill cylinder 30 through which lengthwise pillow type laminated packaging materials are filled with their contents. Then, both sides 31a and 31b of the laminated packaging material are put between a back sealer 33 to carry out heat sealing. The inside of a laminated packaging material 31c formed into a cylinder is filled with contents such as rice crackers from the upper part of the lengthwise pillow type packaging jig, and thereafter the bottom and top of the laminated packaging material formed into a cylinder are heat-sealed with an end sealer 34 provided with a cutter. Thus, a lengthwise pillow type package 40 as shown in FIG. 4 is produced.

However, conventional laminated packaging materials in which aluminum foil is laminated have a great problem in that they have no light transmission properties and hence their contents can not be seen when the materials are worked into baglike packages. They have also the problems that they can not be used in microwave ovens and the production cost of the laminated packaging material is held by the aluminum foil in a high proportion. They have another problem in that aluminum oxide turns into lumps upon thermal disposal of the laminated packaging materials making use of aluminum foil and remains as residues. Accordingly, it is proposed to use in place of the aluminum foil a light-transmissive silicon oxide deposited layer free from such problems (Japanese Utility Model Publications No. 52-3418, No. 52-24608 and No. 53-42310).

As a conventional method of producing a laminated packaging material having such a silicon oxide layer, a method is proposed in which a silicon oxide layer is laminated to a base film such as a flexible nylon film by vacuum deposition, and the silicon oxide surface is optionally subjected to anchor treatment, followed by extrusion coating of a heat-sealable thermoplastic resin to form a sealing medium layer (Japanese Patent Publications No. 51-48511 and No. 52-3418). In this instance, the heat-sealable thermoplastic resin used to form the sealing medium layer is extrusion-coated usually in a thickness of 50 μm or more so that a sufficient heat-sealing strength can be achieved and also the bag can be prevented from breaking.

Since, however, the silicon oxide layer thus formed is a glassy layer tending to crack, the extrusion coating of the heat-sealable thermoplastic resin on that layer in a thickness of 50 μm or more may cause cracks because the base film undergoes expansion and contraction due to heat, bringing about the problem that the oxygen barrier properties and water-vapor barrier properties become poor. In particular, this phenomenon is more remarkable with a decrease in the thickness of the silicon oxide layer.

Besides, when the laminated packaging material having such a silicon oxide layer is used to produce the lengthwise pillow type package in the manner as shown in FIG. 3, the laminated packaging material is drawn through the top 32a of a lengthwise pillow type packaging jig 32, so that the glassy silicon oxide layer may crack, bringing about the problem that the oxygen barrier properties and water-vapor barrier properties become poor.

Accordingly, it is attempted to laminate a polyethylene film serving as a cushioning layer to the silicon oxide layer by the use of an adhesive containing a silane coupling agent and thereby to prevent the silicon oxide layer from cracking. However, the polyethylene film laminated by dry lamination can not have a sufficient cushioning effect, and there still remains the problems of the cracking of the silicon oxide layer and a concurrent lowering of the oxygen barrier properties and water-vapor barrier properties.

SUMMARY OF THE INVENTION

The present invention intends to solve the problems involved in the prior art as discussed above. A first object thereof is to make it possible to carry out extrusion coating of a heat-sealable thermoplastic resin on a silicon oxide layer without causing any lowering of oxygen barrier properties and water-vapor barrier properties, when laminated packaging materials are produced.

A second object of the present invention is to provide a laminated packaging material having a silicon oxide layer as an oxygen and water-vapor barrier layer, and is a laminated packaging material that may cause no lowering of oxygen barrier properties and water-vapor barrier properties that can be problematic in practical use when applied to lengthwise pillow type packages.

The present inventors have discovered that the above first object can be achieved by controlling the extrusion thickness of a heat-sealable thermoplastic resin not to be more than a given thickness when the resin is extrusion-coated on a silicon oxide layer of a laminated packaging material. Thus, a first mode of the present invention has been accomplished.

The first-mode present invention provides a method of producing a laminated packaging material formed of a laminate comprising a base film, a silicon oxide layer and a sealing medium layer 1, wherein the sealing medium layer is formed by laminating a thermoplastic resin to the silicon oxide layer by extrusion coating in a thickness of 30 μm or less. In particular, the present invention is effective when a thermoplastic resin extrudable at a temperature of 270° C. or above, e.g., a low-density polyethylene, is extrusion-coated.

In the first-mode present invention, laminating the thermoplastic resin to the silicon oxide layer by extrusion coating is not limited to directly laminating the thermoplastic resin to the silicon oxide layer by extrusion coating, and, for example, an anchor coat layer may be provided between the silicon oxide layer and the thermoplastic resin so that their adhesion can be improved.

When the thermoplastic resin is extrusion-coated, an additional thermoplastic resin may also be extruded between a thermoplastic resin film and the silicon oxide layer so that the extruded thermoplastic resin layer is put together with the thermoplastic resin film to form a layer serving as the sealing medium layer.

The present inventors have also discovered that the above second object of the present invention can be achieved by providing a thermoplastic resin layer on the silicon oxide layer of a lengthwise pillow type laminated packaging material, formed by laminating a molten thermoplastic resin extruded from a die into a film not as a sealing medium layer but as a cushioning layer. Thus, a second mode of the present invention has been accomplished.

The second-mode present invention provides a lengthwise pillow type laminated packaging material formed of a laminate comprising a sealing medium layer, a base film and a silicon oxide layer, wherein a thermoplastic resin layer and an outer substrate are further laminated outside the silicon oxide layer at the same time the thermoplastic resin layer is formed, by extruding a thermoplastic resin between the outer substrate and the silicon oxide layer.

DETAILED DESCRIPTION OF THE PREFERRED EMBODIMENTS

Figure 1A:
FIG. 1(a)–(e) is a flow sheet of a process for producing the laminated packaging material of the first-mode present invention.

The present invention will be described below in detail with reference to the drawings. In the drawings, the same reference numeral denotes the same or equivalent constituents.

FIGS. 1(a)–1(e) is a flow sheet of a process for producing the laminated packaging material of the first-mode present invention.

First, a base film 1 (FIG. 1(a)) is made ready for use as a substrate of the laminated packaging material. As the base film 1, flexible resin films such as polyethylene, polypropylene and polyester can be used. The thickness of the base film 1 can be appropriately selected according to purpose, without any particular limitations.

Figure 1B:
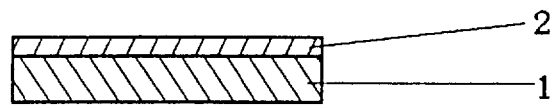

On this base film 1, a silicon oxide layer 2 to impart gas barrier properties, in particular, oxygen barrier properties and water-vapor barrier properties, to the laminated packaging material is formed by a conventional method (FIG. 1(b)). For example, it can be formed by vacuum deposition, ion plating, sputtering, plasma-assisted vacuum deposition or CVD, and preferably by vacuum deposition, which has a great cost advantage.

The silicon oxide layer 2 is composed of a mixture of a silicon compound represented by the formula: $Si_xO_y$ (wherein x is 1 or 2, and y is 1, 2 or 3) mainly comprising silicon monoxide. The silicon oxide layer may have a thickness appropriately selected according to purpose, for example, when used in retort pouches, a thickness of from 1,000 to 1,500 angstroms, and when flexibility is much taken into account, a thickness of from 200 to 800 angstroms, all in approximation.

Figure 1C:
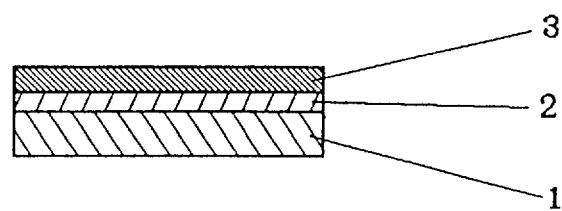
Figure 1D:
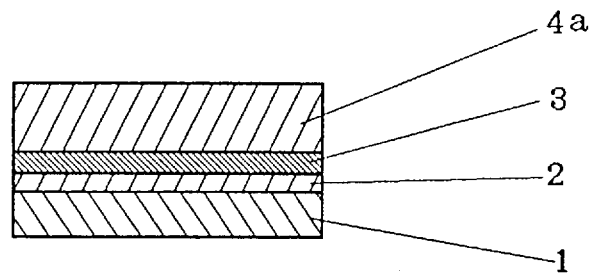

Next, on the silicon oxide layer 2, an anchor coat layer 3 is formed by a conventional method (FIG. 1(c)). For example, an anchor coat agent usually used may be coated on the silicon oxide layer 2, using a gravure plate, a flat plate or a coater, followed by drying. Before this anchor coat layer 3 is formed, an ink layer may be provided on the silicon oxide layer 2, using an ink usually used in packaging materials.

Subsequently, on this anchor coat layer 3, a thermoplastic resin with heat-sealing properties is formed by extrusion coating to form a sealing medium layer 4a. Thus, the laminated packaging material of the present invention is produced (FIG. 1(d)). In this case, the sealing medium layer 4a is made to have such a thickness that no lowering of oxygen barrier properties and water-vapor barrier properties of the silicon oxide layer 2 may be caused by the heat of the thermoplastic resin extruded, i.e., a thickness of 30 μm or less, and preferably from 13 to 30 μm.

Figure 1E:
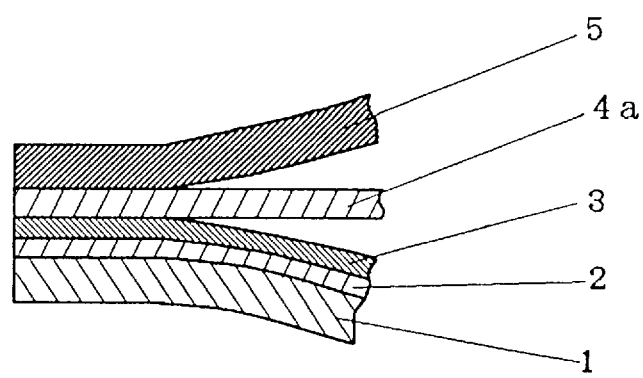

In the case when the sealing medium layer 4a should be made to have a thickness larger than 30 μm in order to achieve the desired heat-sealing properties and film strength, this can be done as follows: As shown in FIG. 1(e), a thermoplastic resin film 5 with heat-sealing properties is prepared in a thickness corresponding to the lacking thickness, and the heat-sealable thermoplastic resin is extruded between it and the silicon oxide layer 2 to carry out sandwich lamination. Alternatively, the extrusion coating may be carried out twice or more to give the desired thickness.

As the thermoplastic resin with heat-sealing properties, the same materials as those conventionally used can be used, as exemplified by polyethylene, polypropylene, an ethylene/vinyl acetate copolymer and ionomers.

Thus, according to the method of producing the laminated packaging material, of the first-mode present invention, the thermoplastic resin layer provided on the silicon oxide layer by extrusion coating is made to have a thickness of 30 μm or less. This makes it possible to decrease the amount of heat the silicon oxide layer receives from the molten resin during the extrusion coating, to such a degree that no damage may occur in the oxygen barrier properties and water-vapor barrier properties of the silicon oxide layer.

Figure 2:
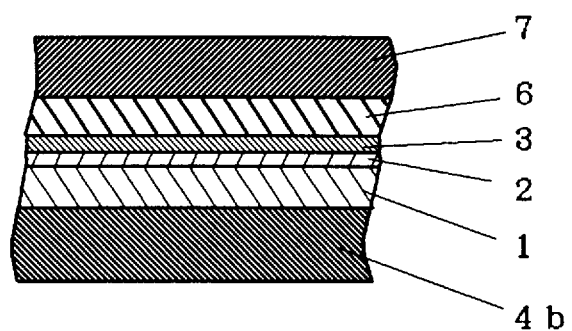
FIG. 2 is a cross-sectional view of the lengthwise pillow type laminated packaging material of the present invention.

FIG. 2 is a cross-sectional view of an example of the lengthwise pillow type laminated packaging material of the second-mode present invention. In the drawing, the lengthwise pillow type laminated packaging material has a structure in which a sealing medium layer 4b, a base film 1, a silicon oxide layer 2, an anchor coat layer 3, a thermoplastic resin layer 6 and an outer substrate 7 are successively laminated.

Figure 3:
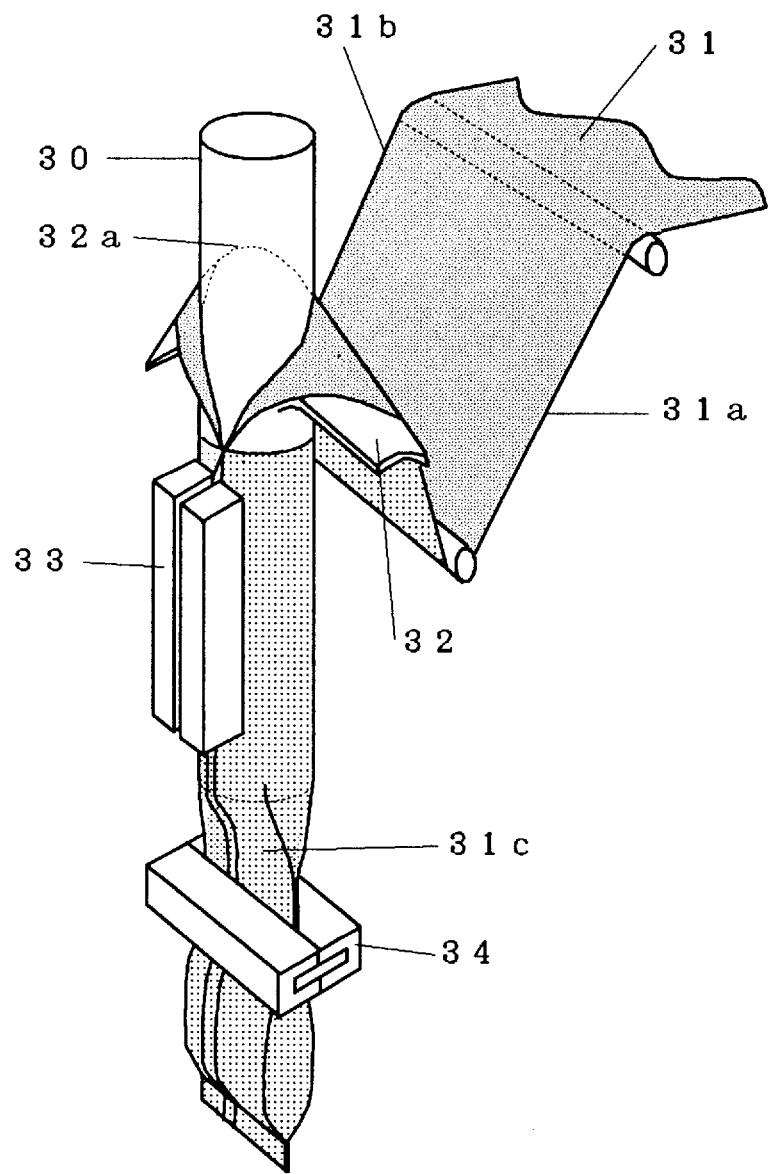
FIG. 3 illustrates a method of producing the lengthwise pillow type laminated packaging material.
Figure 4:
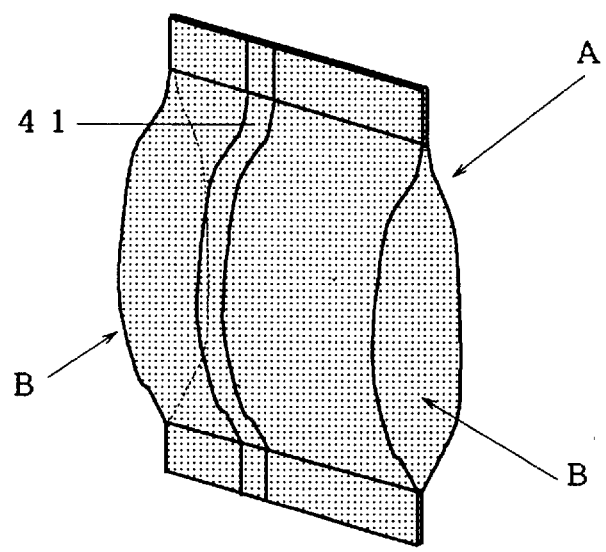
FIG. 4 is a perspective view of a lengthwise pillow type package.

During lengthwise pillow type packaging, the outer substrate 7 is brought into contact with the lengthwise pillow type packaging jig 32 shown in FIG. 3, and may also be provided with prints. Hence, a sheetlike material feasible for printing and also with a good slipperiness is used as the outer substrate 7. As the sheetlike material, it is possible to use thin papers, and thermoplastic resin sheets or films as exemplified by nylon sheets, polypropylene sheets and polypropylene films. There are no particular limitations on the thickness of the outer substrate 7, and may be appropriately selected according to purpose.

The thermoplastic resin layer 6 is a layer made to function as a cushioning layer so that the silicon oxide layer 2 formed on the base film 1 can be prevented from cracking during the lengthwise pillow type packaging. The thermoplastic resin layer 6 is formed in the manner according to the extrusion coating of the sealing medium layer 4a in the first-mode present invention as described in relation to FIG. 1, i.e., by extrusion lamination of a thermoplastic resin melted and extruded from a die into a film between the outer substrate 7 and the silicon oxide layer 2. The thermoplastic resin layer 6 formed by such extrusion lamination has so good an adhesion to the silicon oxide layer 2 that a load applied to the silicon oxide layer 2 during the lengthwise pillow type packaging can be decreased to make no cracking tend to occur. The thermoplastic resin layer 6 also has a function to bring the outer substrate 7 and the silicon oxide layer 2 into close adhesion.

As materials for the thermoplastic resin layer 6, it is possible to use polyolefin resins such as polyethylene and polypropylene, an ethylene/vinyl acetate copolymer, ionomers, etc. In particular, low-density polyethylene can be preferably used. There are no particular limitations on the thickness of the thermoplastic resin layer 6, which may preferably have a thickness of 30 $\mu$m or less. This is because, if the thickness is, e.g., as large as 50 $\mu$m, the heat of the thermoplastic resin extruded may make poor the oxygen barrier properties and water-vapor barrier properties of the silicon oxide layer 2. If the thermoplastic resin layer 6 has a thickness smaller than 10 $\mu$m, its cushioning effect may become short.

When the thermoplastic resin layer 6 is formed on the silicon oxide layer 2 by extrusion lamination, a water-based anchor coat material containing water may previously be coated on the silicon oxide layer 2 followed by drying to form an anchor coat layer 3. This is preferable in order to improve the adhesion between the both layers. In the water-based anchor coat material, it is possible to use a polyethyleneimine type anchor coat agent or a polybutadiene type anchor coat agent.

The silicon oxide layer 2 is a layer that functions as a oxygen and water-vapor barrier layer, and is as described in relation to FIG. 1. The base film 1 is a support of the silicon oxide layer 2, and is also as described in relation to FIG. 1.

The sealing medium layer 4b is a layer that is joined when a bag is formed from the laminated material by heat sealing.

In the case when the sealing medium layer 4b is not formed on the silicon oxide layer 2 like the sealing medium layer 4a as shown in FIG. 1 but formed on the base film 1 as shown in FIG. 2, the sealing medium layer 4b can be formed using the same materials as those conventionally used, as exemplified by heat-sealable thermoplastic resin films comprising polyethylene, polypropylene, an ethylene/vinyl acetate copolymer or an ionomer. Such a heat-sealable thermoplastic resin film can be laminated, for example, by dry lamination using an adhesive such as a urethane type two-part adhesive. The sealing medium layer 4b may also be formed by coating an anchor coat material on the base film 1, followed by extrusion coating of a heat-sealable thermoplastic resin. There are no particular limitations on the thickness of the sealing medium layer 4b, and may be appropriately selected as occasion calls.

The lengthwise pillow type laminated packaging material of the second-mode present invention can be produced by conventional methods. For example, it can be produced in the following way: The silicon oxide layer is formed by vacuum deposition on one side of a polyethylene. terephthalate film, and to the back of the polyethylene terephthalate film a polypropylene film as the sealing medium layer is laminated using an adhesive. Subsequently, an anchor coat material is coated on the silicon oxide layer, followed by drying. In the meantime, a thin paper is made ready for use. While a low-density polyethylene is extruded into a film between the thin paper and the silicon oxide layer, the thin paper and the filmlike low-density polyethylene are laminated to the silicon oxide layer by extrusion.

Thus, in the lengthwise pillow type laminated packaging material of the second-mode present invention, the outer substrate 7 and the thermoplastic resin layer 6 are laminated to the silicon oxide layer, and hence it becomes possible to decrease the load applied to the silicon oxide layer 2 during the lengthwise pillow type packaging. This makes it possible to prevent the oxygen barrier properties and water-vapor barrier properties from lowering.

EXAMPLES

The present invention will be described below in greater detail by giving Examples.

Example 1

On a silicon oxide layer of a laminated packaging material (Toyo GT-1000S1, available from Toyo Ink Mfg. Co., Ltd.) comprising a polyethylene terephthalate film to one side of which the silicon oxide layer with a thickness of 1,000 Å had been laminated, a print layer was formed (line speed: 90 m/min; line tension: 7 kg/cm$^2$; drying temperature: 60° C.) so as to be in a dried coating thickness of 2 to 3 $\mu$m using an oil-based ink (LP SUPER, available from Toyo Ink Mfg. Co., Ltd.).

On this ink layer, a water-based polyethyleneimine type anchor coat material (P-1000, available from Nippon Shokubai Kagaku Kogyo Co., Ltd.) was coated, and then the coating was dried, followed by extrusion coating of polyethylene in a thickness of 30 $\mu$m. Thus, a laminated packaging material was obtained. Oxygen barrier properties and water-vapor barrier properties of the laminated packaging material obtained were measured in the following way on its solid print areas and plain areas.

Oxygen barrier properties

Oxygen transmission ($O_2$TR, cc/m$^2$·day) was measured in regard to the oxygen barrier properties, under atmospheric pressure under conditions of 25° C. and 100% RH using OX-TRAN10/50A (manufactured by Modern Controls, Inc.). Results obtained are shown in Table 1.

Water-vapor barrier properties

Water vapor transmission (WVTR, g/m$^2$·day) was measured in regard to the water-vapor barrier properties, under atmospheric pressure under conditions of 40° C. and 100% RH using a water vapor transmission tester (PERMATRAN-W TWIN, manufactured by Modern Controls, Inc.). Results obtained are shown in Table 1.

As is clear from Table 1, the laminated packaging material of the present Example shows oxygen transmission and water vapor transmission with lower values than the following instances in which polyethylene is extrusion-coated in a thickness larger than 30 μm (Comparative Examples 1 and 2), and is seen to have good properties.

Comparative Example 1

A laminated packaging material was produced in the same manner as in Example 1 except that the polyethylene was extrusion-coated in a thickness of 40 μm. Its oxygen transmission and water vapor transmission were also measured. Results obtained are shown in Table 1. As is clear from Table 1, the laminated packaging material of the present Comparative Example shows oxygen transmission and water vapor transmission with large values, and is seen to have inferior oxygen barrier properties and water-vapor barrier properties.

Comparative Example 2

A laminated packaging material was produced in the same manner as in Example 1 except that the polyethylene was extrusion-coated in a thickness of 50 μm. Its oxygen transmission and water vapor transmission were also measured. Results obtained are shown in Table 1. As is clear from Table 1, the laminated packaging material of the present Comparative Example is seen to have inferior oxygen barrier properties and water-vapor barrier properties.

Example 2

A laminated packaging material was produced in the same manner as in Example 1 except that the water-based polyethyleneimine type anchor coat material was replaced with a water-based butadiene type anchor coat material (EL-451, available from Toyo Ink Mfg. Co., Ltd.). Its oxygen transmission and water vapor transmission were also measured. Results obtained are shown in Table 1. As is clear from Table 1, the laminated packaging material of the present Example shows oxygen transmission and water vapor transmission with lower values than the following instances in which polyethylene is extrusion-coated in a thickness larger than 30 μm (Comparative Examples 3 and 4).

Comparative Example 3

Oxygen transmission and water vapor transmission were measured in respect of a laminated packaging material produced in the same manner as in Example 2 except that the polyethylene was extrusion-coated in a thickness of 40 μm. Results obtained are shown in Table 1. As is clear from Table 1, the laminated packaging material of the present Comparative Example is seen to have inferior oxygen barrier properties and water-vapor barrier properties.

Comparative Example 4

Oxygen transmission and water vapor transmission were measured in respect of a laminated packaging material produced in the same manner as in Example 2 except that the polyethylene was extrusion-coated in a thickness of 50 μm. Results obtained are shown in Table 1. As is clear from Table 1, the laminated packaging material of the present Comparative Example is seen to have inferior oxygen barrier properties and water-vapor barrier properties.

Example 3

A laminated packaging material was produced in the same manner as in Example 1 except that the water-based polyethyleneimine type anchor coat material was replaced with a water-based urethane type anchor coat material (980A/B, available from Toyo Ink Mfg. Co., Ltd.). Its oxygen transmission and water vapor transmission were also measured. Results obtained are shown in Table 1. As is clear from Table 1, the laminated packaging material of the present Example shows oxygen transmission and water vapor transmission with lower values than the following instances in which polyethylene is extrusion-coated in a thickness larger than 30 μm (Comparative Examples 5 and 6).

Comparative Example 5

Oxygen transmission and water vapor transmission were measured in respect of a laminated packaging material produced in the same manner as in Example 3 except that the polyethylene was extrusion-coated in a thickness of 40 μm. Results obtained are shown in Table 1. As is clear from Table 1, the laminated packaging material of the present Comparative Example is seen to have inferior oxygen barrier properties and water-vapor barrier properties.

Comparative Example 6

Oxygen transmission and water vapor transmission were measured in respect of a laminated packaging material produced in the same manner as in Example 3 except that the polyethylene was extrusion-coated in a thickness of 50 μm. Results obtained are shown in Table 1. As is clear from Table 1, the laminated packaging material of the present Comparative Example is seen to have inferior oxygen barrier properties and water-vapor barrier properties.

TABLE 1

|  | $O_2$TR | | WVTR | |
| --- | --- | --- | --- | --- |
|  | Solid print areas | Plain areas | Solid print areas | Plain areas |
| Example 1 | 7.2 | 18.4 | 7.0 | 5.9 |
| Comparative Example 1 | 55.2 | 41.3 | 10.2 | 7.5 |
| Comparative Example 2 | 52.1 | 54.7 | 9.1 | 7.7 |
| Example 2 | 3.0 | 9.5 | 3.0 | 5.5 |
| Comparative Example 3 | 40.0 | 44.4 | 9.3 | 7.1 |
| Comparative Example 4 | 46.1 | 46.0 | 9.2 | 7.5 |
| Example 3 | 12.2 | 4.2 | 5.7 | 5.0 |
| Comparative Example 5 | 42.8 | 44.6 | 9.7 | 10.0 |
| Comparative Example 6 | 42.1 | 49.1 | 8.6 | 9.0 |

Example 4

On one side of a 12 μm thick biaxially oriented polyethylene terephthalate film (trade name: P-11; available from Toray Industries, Inc.), a silicon oxide layer was formed by vacuum deposition in a thickness of 800 angstroms.

Meanwhile, a urethane type two-part adhesive (AD811A/B, available from Toyo Morton Co.) was coated on a 30 μm thick casted polypropylene film at a rate of 1.5 g/m², and its adhesive surface and the back surface of the above polyethylene terephthalate film were put together.

On the silicon oxide layer of the laminated packaging material thus obtained, a water-based butadiene type anchor coat material (EL451, available from Toyo Ink Mfg. Co., Ltd.) was coated using a gravure coater with a plate of 26 μm in plate depth. The material thus coated was put in a 50° C. drying oven and dried for 3 seconds.

The silicon oxide layer of the resulting laminated packaging material and a thin paper (AFT, available from Tenma Seishi K.K.) with a basis weight of 20 g/m² were extrusion-laminated while low-density polyethylene was extruded between them into a film of 15 μm thick. Thus, a lengthwise pillow type laminated packaging material was produced.

On this lengthwise pillow type laminated packaging material, oxygen barrier properties and water-vapor barrier properties before and after lengthwise pillow type packaging were measured in the same manner as in Example 1 to obtain the results as shown in Table 2. In Table 2, the "front" indicates the face A on the side opposite to the face having a back seal 41 of the lengthwise pillow type package 40, and the "sides", the both sides B of the lengthwise pillow type package 40.

Comparative Example 7

Example 6 was repeated to produce a laminated packaging material, except that, in place of the extrusion of the low-density polyethylene between the thin paper and the silicon oxide layer, a urethane type two-part adhesive (AD811A/B, available from Toyo Morton Co.) was coated on the silicon oxide layer at a rate of 2 g/m² and the thin paper was laminated by dry lamination. On this laminated packaging material, the oxygen barrier properties and water-vapor barrier properties were also measured in the same manner as in Example 1. Results obtained are shown in Table 2.

TABLE 2

|  | O₂TR | WVTR |
|---|---|---|
| Example 1: |  |  |
| Before packaging | 0.8 | 0.5 |
| After packaging (Front) | 4.4 | 1.1 |
| After packaging (Sides) | 1.6 | 0.7 |
| Comparative Example 1: |  |  |
| Before packaging | 0.7 | 0.7 |
| After packaging (Front) | 8.7 | 3.9 |
| After packaging (Sides) | 7.1 | 4.5 |

As is clear from Table 2, compared with the materials of Comparative Example, the lengthwise pillow type laminated packaging material of the present invention is seen to remarkably maintain the oxygen barrier properties and water-vapor barrier properties after the lengthwise pillow type packaging.

As described above, the production method of the present invention is particularly useful when packaging materials for food, medical supplies, etc. are produced. The lengthwise pillow type laminated packaging material of the present invention is also particularly useful as packaging materials for food, medical supplies, etc.

What is claimed is:

1. A method of producing a laminated packaging material comprising the steps of:

(a) forming a silicon oxide layer on a base film; and (b) laminating a low-density polyethylene layer directly on the silicon oxide layer by extrusion coating at a temperature of 270° C. or above to a thickness of 30 μm or less, the low-density polyethylene layer serving as a sealing medium layer.

2. The method of producing a laminated packaging material according to claim 1, wherein step (b) is repeated plural times to form the sealing medium layer.

3. A method of producing a laminated packaging material comprising the steps of:

(a) forming a silicon oxide layer on a base film;

(b) providing a thermoplastic resin film; and (c) extruding low-density polyethylene to a layer thickness of 30 μm or less directly on the silicon oxide layer, between the silicon oxide layer and the thermoplastic resin film by extrusion coating at a temperature of 270° C. or above, the thermoplastic resin film and the low-density polyethylene serving as a sealing medium layer.

4. A lengthwise laminated packaging material comprising:

a sealing medium layer;

a base film formed on the sealing medium layer;

a silicon oxide layer formed on the base film;

an outer substrate; and a low-density polyethylene layer formed by extruding low-density polyethylene directly on the silicon oxide layer, between the outer substrate and the silicon oxide layer to thereby simultaneously form the low-density polyethylene layer and laminate the outer substrate to the silicon oxide layer.

5. The lengthwise laminated packaging material according to claim 4, wherein said low-density polyethylene layer has a thickness of 30 μm or less.

* * * * *